Figure 14:
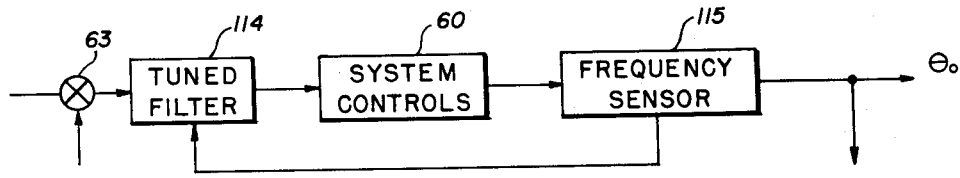

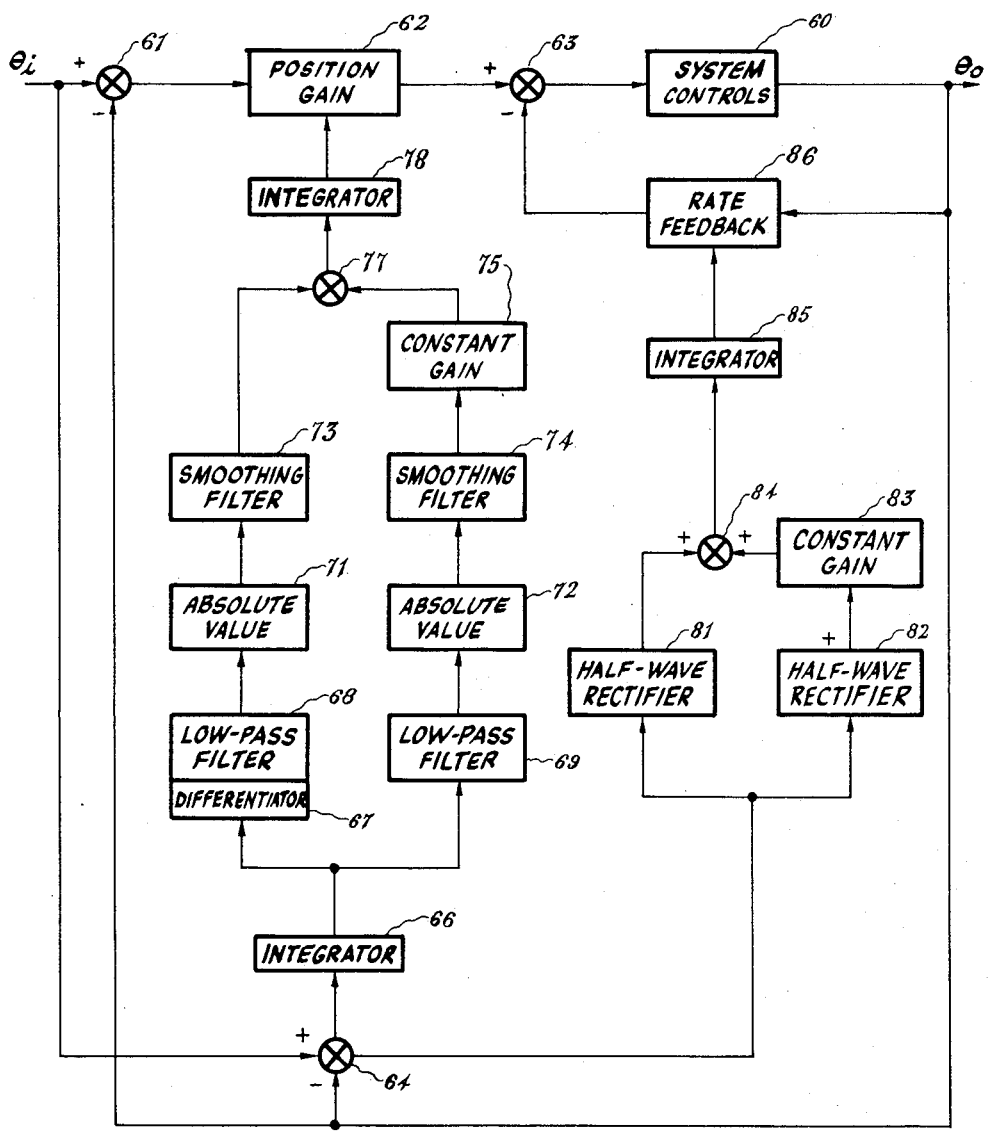
Fig_1_

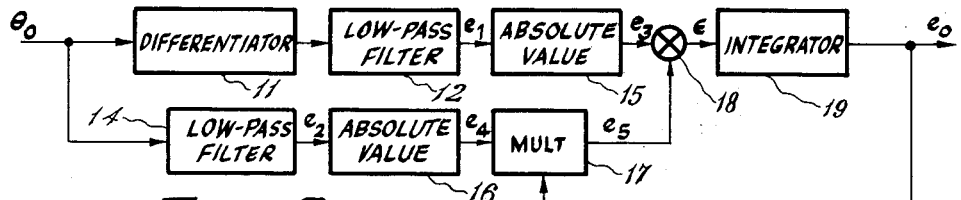
Fig_2_
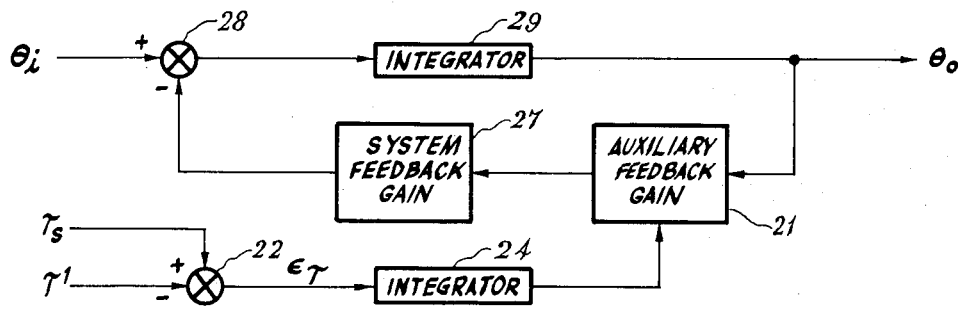
Fig_3_
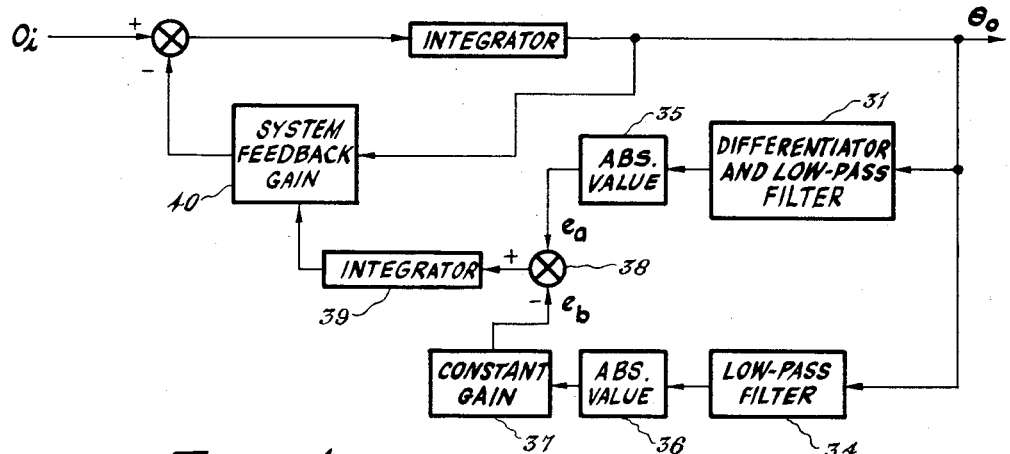
Fig_4_

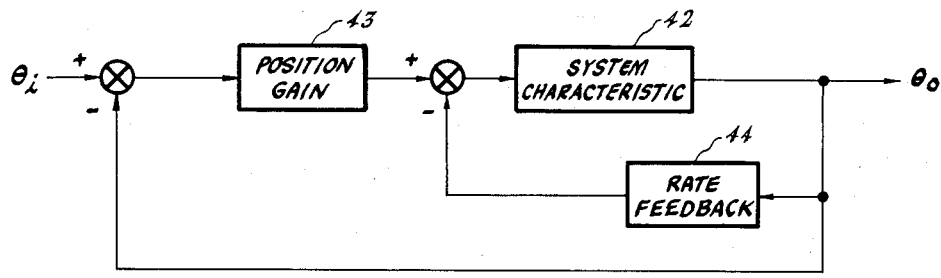
*Fig_5_*
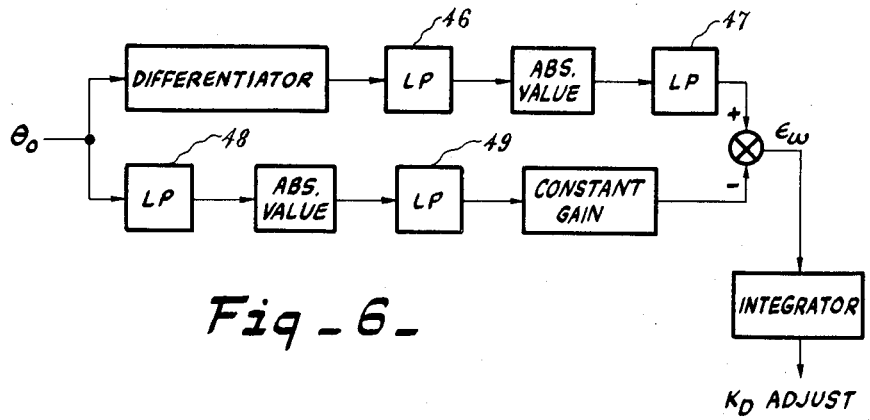
*Fig_6_*
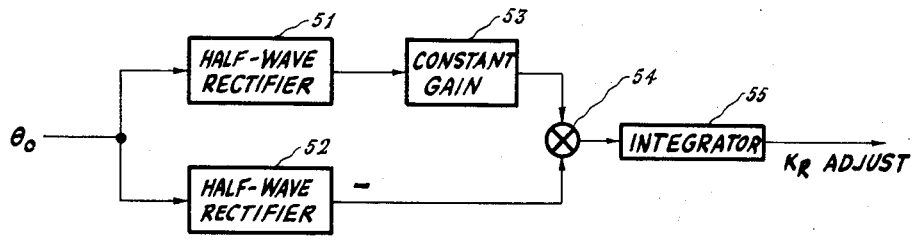
*Fig_7_*
INVENTORS.
GEORGE W. SMITH
BION E. HENDERSON
BY Earl C. Hancock
AGENT

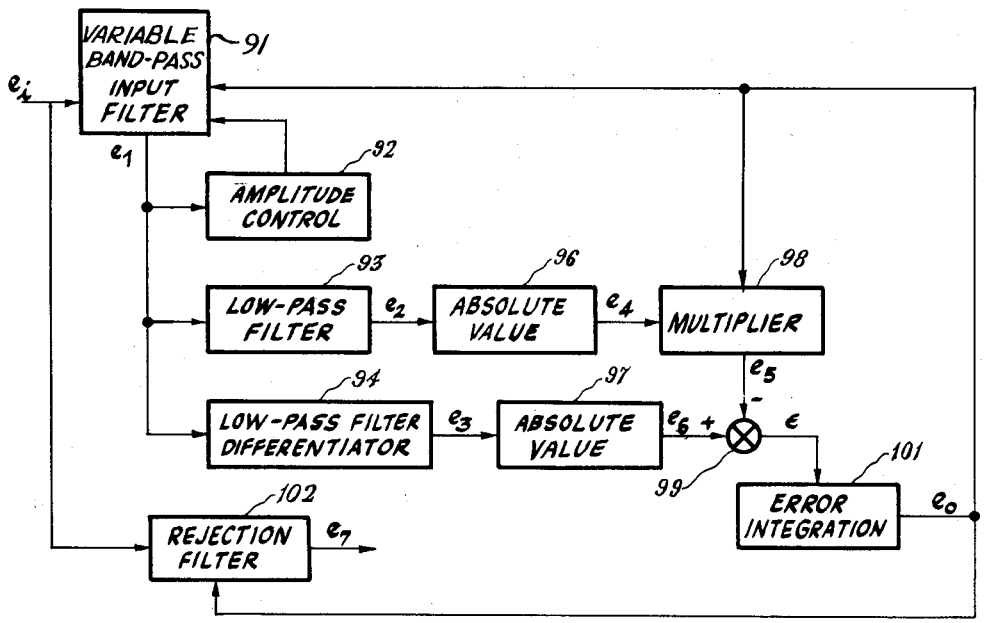
Fig_8_
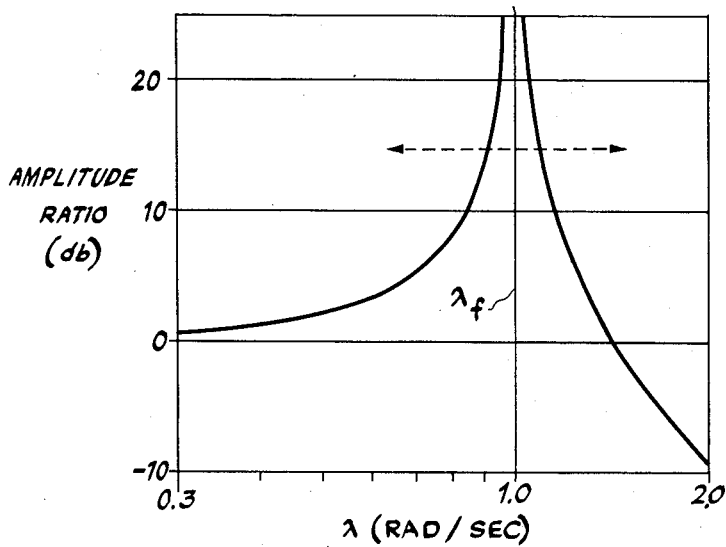
Fig_9_

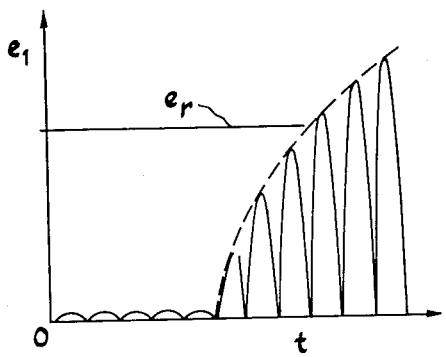
Fig-10-
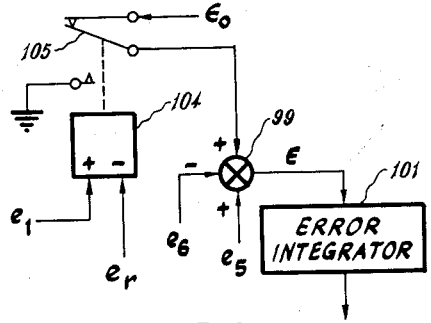
Fig-11-
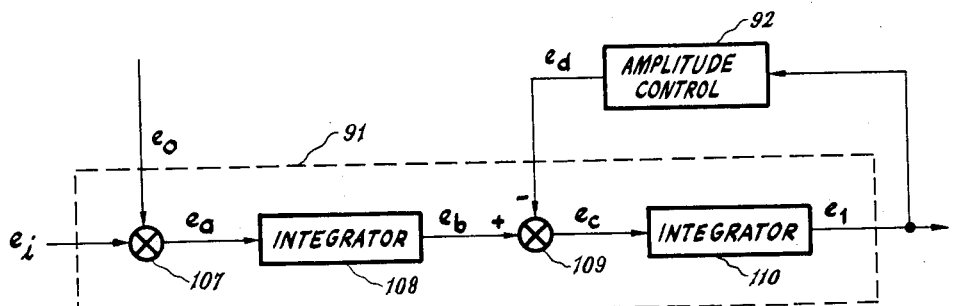
Fig-12-
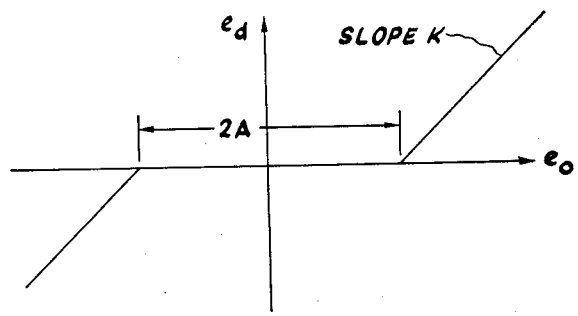
Fig-13-
INVENTORS.
GEORGE W. SMITH
BION E. HENDERSON
BY
Earl C. Hancock
AGENT June 16, 1964 G. W. SMITH ETAL 3,137,459
CLOSED LOOP SERVO CONTROL SYSTEM
Filed July 14, 1960 8 Sheets-Sheet 7

INVENTORS
GEORGE W. SMITH
BION E. HENDERSON
BY
Earl C. Hancock
AGENT

United States Patent Office 3,137,459
Patented June 16, 1964

3,137,459
CLOSED LOOP SERVO CONTROL SYSTEM
George W. Smith and Bion E. Henderson, Littleton, Colo., assignors to Martin-Marietta Corporation, a corporation of Maryland
Filed July 14, 1960, Ser. No. 42,821
12 Claims. (Cl. 244—77)

This invention relates to self-adaptive electronics system capable of examining an input signal and producing a controlled output signal therefrom. In particular, one form of the present invention pertains to a system capable of self-tuning in compliance with certain variable frequencies sensed from a complex waveform introduced thereto so as to pass a desired frequency that may be shifting while blocking passage therethrough of other frequencies. Another form of the present invention relates to a self-adaptive control system especially useful for maintaining the autopilot feedback of a rigid body missile in proportion to the natural frequency of such a missile. Still another form of this invention relates to a system for controlling the autopilot system of an elastic missile wherein the varying complex input signals are automatically examined so that false feedback signals resulting from the sensing of undesired elastic modes will be blocked from the autopilot feedback loop while the frequencies related to the natural frequency of rigid body motion of the missile about its center of gravity will be introduced to the autopilot feedback loop.

It is known that a missile in flight has a tendency to oscillate or bend about its center of gravity at varying frequencies and in varying modes dependent upon structural design, mass, fuel load, fuel consumption rates, and a variety of other variable factors. This bending motion occurs in two distinct modes, the primary mode resulting from rigid body motion about the center of gravity and the secondary modes resulting from elastic body motion as a result of tensile and compressive stresses, the resiliency of the materials and the like. The autopilot system of the missile must actute an attitude control device to compensate for the rigid body motion in order to maintain stable flight. However, the sensing devices such as accelerometers, gyroscopes, and strain gauges, for instance, which provide the essential information for the autopilot will sense the aforementioned primary and secondary modes alike and thus the input signals to the missile autopilot system will not only contain frequencies indicative of the rigid body motion and the programmed navigation commands but will have superimposed thereon the undesired secondary modes. It should be readily apparent that the elastic bending modes do not occur with any relation to the center of gravity of the missile and thus introduction of these signals to the missile autopilot system will cause instability due to a regenerative feedback effect and thereby possibly cause unintended by catastrophic destruction of the missile.

The present invention provides a self-adaptive control system for stabilizing the operation of an autopilot for a missile. For purposes of this invention, a self-adaptive control system is defined as a control system that can examine its own closed loop response and adjust its internal gains and/or compensating networks in such a manner that this response comes arbitrarily close to some predetermined optimum. In the present invention, self adaption is accomplished by means of interrogating input impulses and an analysis of the resultant output waveform. The system then examines the results of the analysis and the control system feedback gains are varied in such a way as to maintain a system response which is arbitrarily close to some predetermined optimum.

Figure 15:
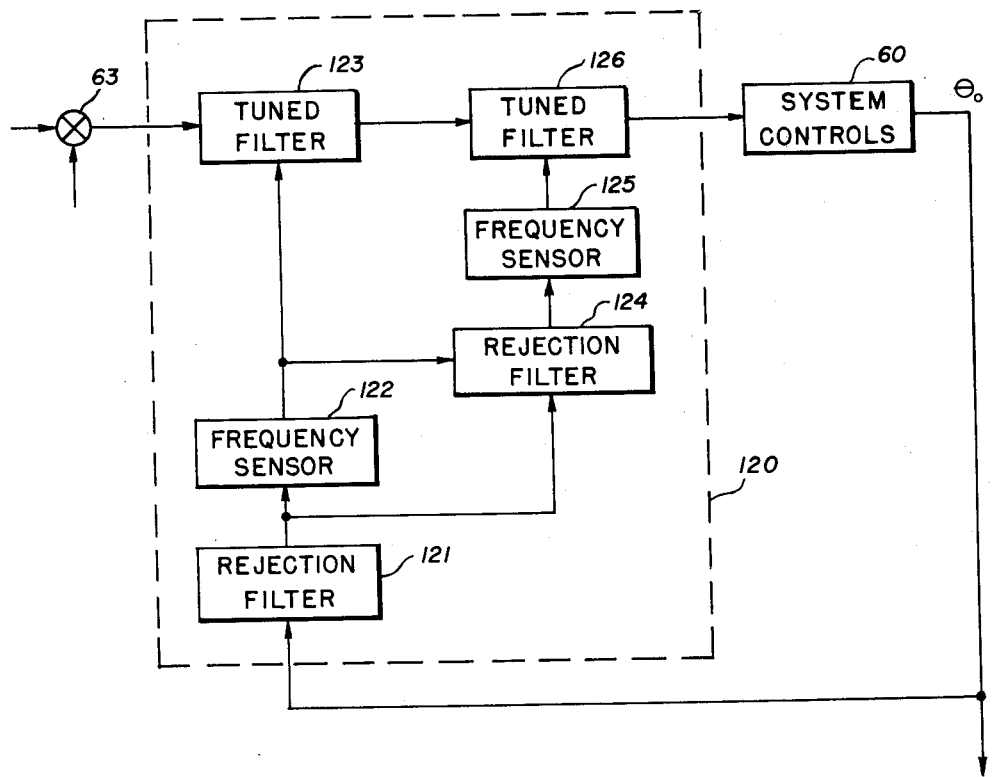
Figure 16:
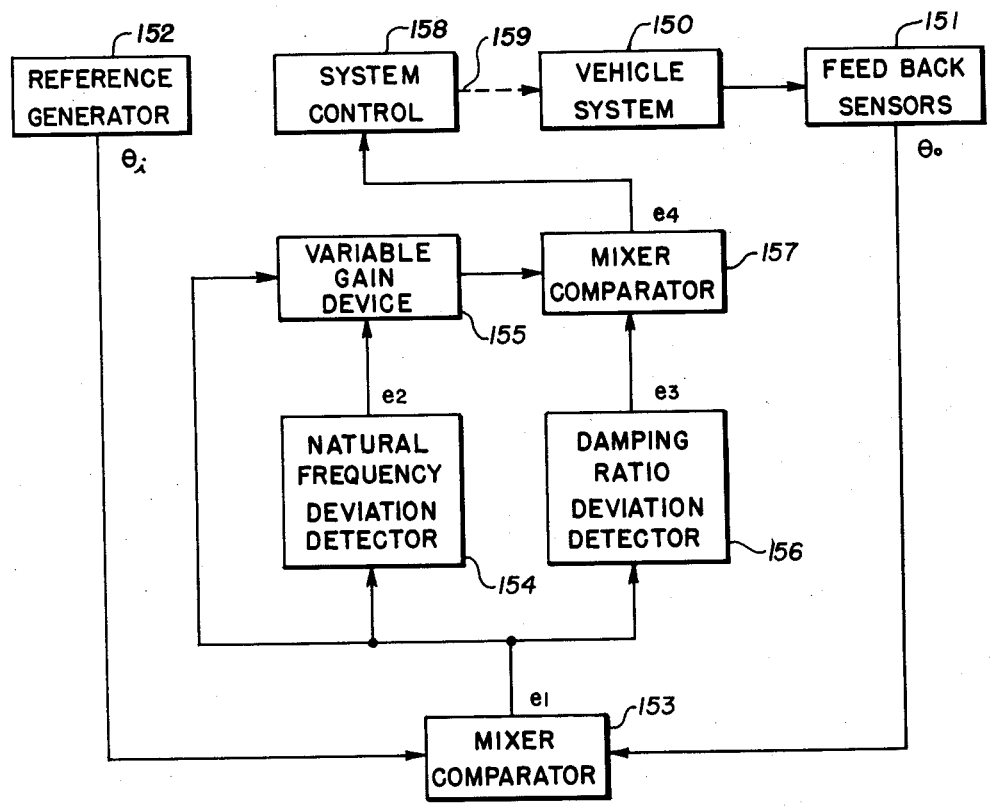
Figure 17:
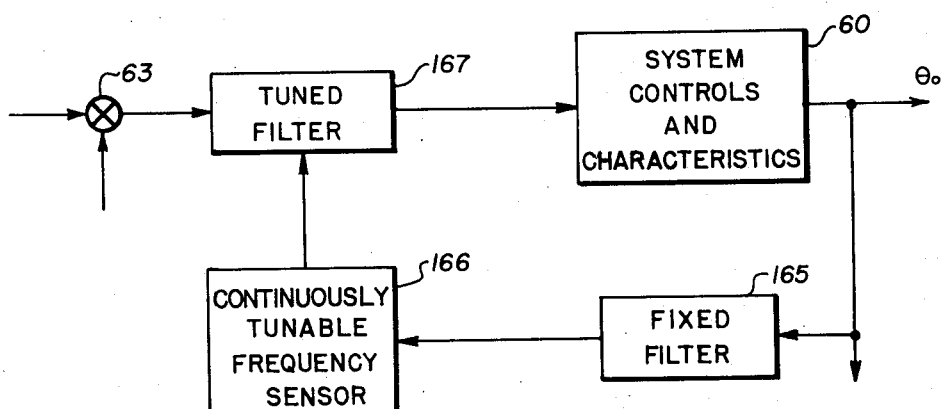
Figure 18:
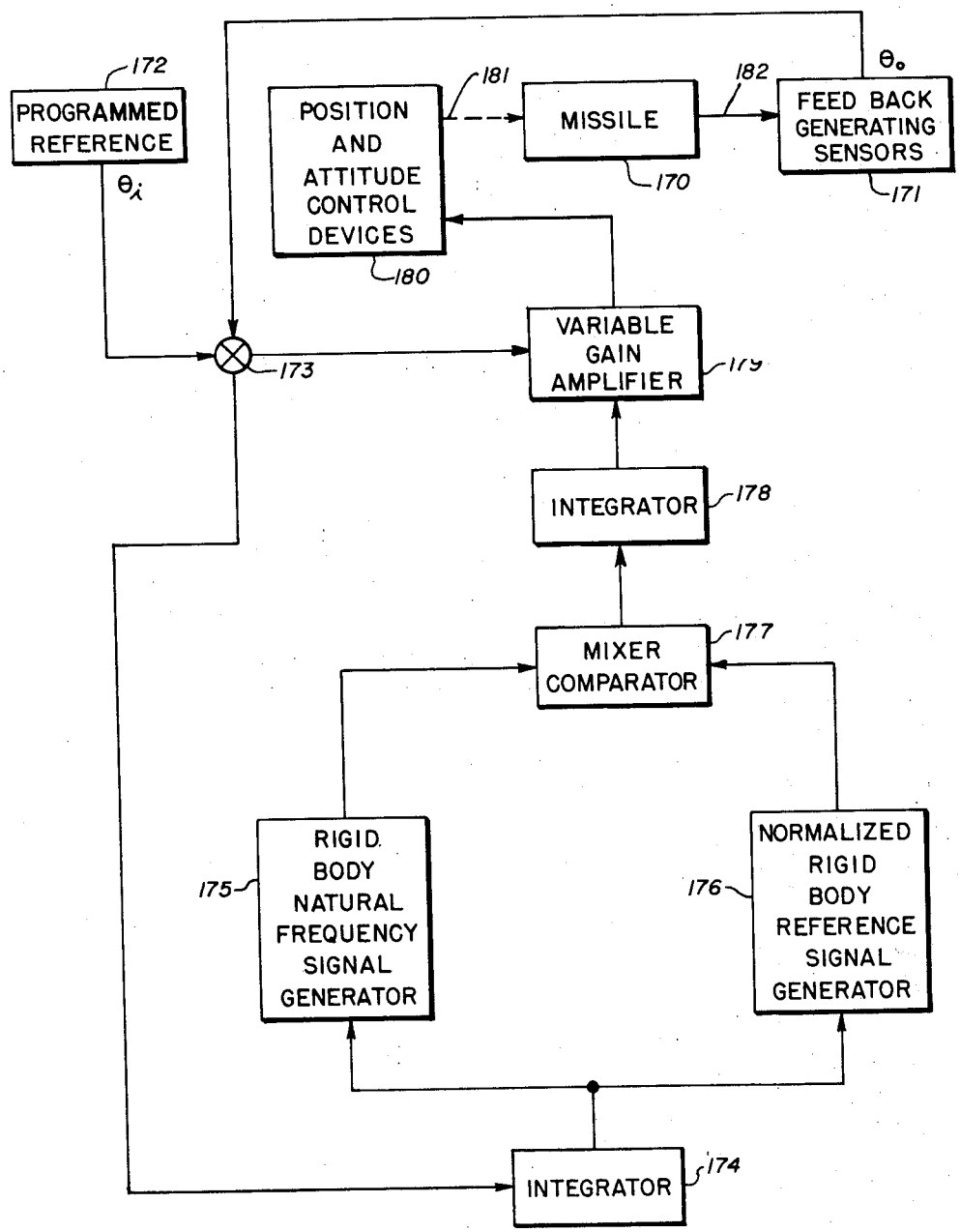

The nature of the invention and further novel features thereof will be more fully understood from the following descriptions and analysis of the accompanying drawings wherein:

FIGURE 1 is one embodiment of a self-adaptive control system in accordance with this invention; and
FIGURE 2 is system for controlling an output signal in relation to the input; and
FIGURE 3 is a self-adaptive system employing auxiliary gain; and
FIGURE 4 is a self-adaptive system that does not need a multiplier; and
FIGURE 5 is a normal second order closed-loop system; and
FIGURE 6 is a system for self-adaption of the system natural frequency; and
FIGURE 7 is a portion of circuitry for self-adaption of the system damping ratio to a desired damping ratio; and
FIGURE 8 is a block diagram of a self-tuning frequency sensor; and
FIGURE 9 is a graph of the characteristics of the input filter for FIGURE 8; and
FIGURE 10 is a time history of the output of the tuned input filter of FIGURE 8; and
FIGURE 11 is an automatic sweep feature for FIGURE 8; and
FIGURE 12 is a detailed block diagram of the input filter and amplitude control therefor; and
FIGURE 13 is a chart of a typical dead band characteristic for FIGURE 12; and
FIGURE 14 is a block diagram of a modification of the self-adaptive system shown in FIGURE 1 to include the frequency sensor feature; and
FIGURE 15 is a block diagram illustrating how the self-adaptive servo system in accordance with FIGURE 1 can be modified to accommodate a rigid body motion plus two bending modes; and
FIGURE 16 illustrates a somewhat more general configuration of the circuitry of FIGURE 1; and
FIGURE 17 reveals an arrangement for modifying the system of FIGURE 1 so as to include the self-tuning feature; and
FIGURE 18 shows a system in accordance with the present invention wherein only the rigid body compensation circuitry is included.

Throughout the following descriptions, the letter S shall denote the Laplacean operator.

First, the problem of self-adapting a first order closed loop servo system will be examined. Such a system is described by the following differential equation:

$$\theta_0 + \tau(t)\dot{\theta}_0 = \tau(t)\theta_1$$

where:

$\theta_0$ = output response of the system
$\theta_1$ = input command or reference signal and
$\tau(t)$ = a time varying system coefficient.

As $\tau(t)$ varies in the above system the performance characteristics of the servo such as steady state gain and dynamic response also vary. Such a system could simply be represented by a mixer connected to receive an input voltage $\theta_1$ and to feed an integrator representable by $1/S$ which in turn produces an output voltage $\theta_0$. The voltage $\theta_0$ would be fed back to the mixer by a circuit having a gain of $1/\tau$ thus producing an overall operating ratio of:

$$\frac{\theta_0}{\theta_1} = \frac{\tau(t)}{1+\tau(t)S}$$

To make such a system self adaptive, a suitable interrogating signal must be introduced such as a series of alternately positive and negative impulses whose magnitude is just sufficient to excite the output sensing transducers. Since the impulses are alternately positive and negative, the average output due to the impulses will be zero. It is assumed that time variations of $\tau(t)$ are negligible during an interrogation. For the system under discussion, the impulse or weighting function is:

$$W(t) = \mathcal{L}^{-1}\left\{\frac{\tau(t)}{1+\tau(t)S}\right\} = e^{-\frac{t}{\tau(t)}}$$

and:

$$\dot{W}(t) = -\frac{1}{\tau(t)}e^{-\frac{t}{\tau(t)}}$$

Thus:

$$|W(t)| = \tau(t)|\dot{W}(t)|$$

and the ratio of the absolute value of the system weighting function to the absolute value of the weighting function time derivative is the system coefficient $\tau(t)$. It is this relationship from which the circuitry shown in FIGURE 2 was developed.

The system output provides the input voltage $\theta_o$ for the system of FIGURE 2 and this voltage is introduced simultaneously to a pair of parallel paths. The voltage $\theta_o$ is passed through differentiator 11 and then low pass filter 12 in the upper path, differentiator and filter 12 having the Laplace transform $$\frac{S}{1+\tau_1 S}$$

where the lag term $$\frac{1}{1+\tau_1 S}$$

is included to provide high frequency cutoff and $\tau_1$ is a circuit coefficient. In the lower path of FIGURE 2, a corresponding lag $$\frac{1}{1+\tau_1 S}$$

is introduced by low pass filter 14 in order to preserve the proper phase relationship between $e_1$ and $e_2$. Since the system input was a unit impulse:

$$\theta_o = W(t)$$

and:

$$\dot{\theta}_o(t) = \dot{W}(t)$$

therefore:

$$e_1 = \frac{\dot{W}(t)}{1+\tau_1 S}$$

$$e_2 = \frac{\dot{W}(t)}{1+\tau_1 S}$$

The sign or polarity reference is added to $e_1$ and $e_2$ by absolute value circuits 15 and 16 respectively each of which could be full-wave rectifiers. The output of 15 and 16 can then be represented by:

$$e_3 = \left|\frac{\dot{W}(t)}{1+\tau_1 S}\right| = \frac{1}{\tau(t)}\left|\frac{W(t)}{1+\tau_1 S}\right|$$

$$e_4 = \left|\frac{W(t)}{1+\tau_1 S}\right|$$

Voltage $e_4$ and the output voltage $e_o$ are combined in multiplier 17 thus producing $e_5$, and the error voltage output $\epsilon$ of mixer 18 will be the difference of $e_3$ and $e_5$. If $$e_o = \frac{1}{\tau(t)}$$

then:

$$\epsilon = e_3 - e_5 = \frac{1}{\tau(t)}\left|\frac{W(t)}{1+\tau_1 S}\right| - \frac{1}{\tau(t)}\left|\frac{W(t)}{1+\tau_1 S}\right| = 0$$

However, if $e_o$ is a value other than $$\frac{1}{\tau(t)}$$

the resultant error $\epsilon$ will be passed through integrator 19 representable by the transform $K/S$ and $e_o$ will increase or decrease depending upon the sign of the error in such a way as to drive the error to zero. Thus it can be seen that a steady state output occurs when $$e_o = \frac{1}{\tau(t)}$$

Now let the system $\tau(t)$ as computed for FIGURE 2 be $\tau'$, and let the desired or set constant value of $\tau(t)$ be represented by $\tau_s$. The circuit shown in FIGURE 3 accomplishes self-adaption by insertion of an auxiliary gain circuit 21, representable by $K_\gamma$, in the feedback loops, and circuit 21 is to be continuously adjusted so that the product $$K_\gamma \frac{1}{\tau'} = \frac{1}{\tau_s}$$

If $\tau'$ does not equal $\tau_s$, then the comparison of these two signals at mixer 22 will produce an error signal $\epsilon_\gamma$ which is passed through integrator 24 the output of which is used to adjust feedback gain 21 or $K_\gamma$ which becomes unity when $\tau' = \tau_s$. The system feedback gain or $1/\tau'$ is compared with the input voltage $\theta_i$ at mixer 28 with the resultant thereof being passed through integrator 29 which performs the function of a $1/S$ transform and produces output voltage $\theta_o$.

FIGURE 4 shows another self-adaptive system but which does not require the use of a multiplier. In this circuit it will be recognized that elements 31, 34, 35 and 36 perform a function similar to that of 11, 12, 14, 15 and 16 of FIGURE 2. However, constant gain circuit 37 is included in one of the paths which circuit has a gain of $$\frac{1}{\tau_s}$$

An examination of the two output voltages $e_a$ and $e_b$ which are introduced to mixer 38 reveals that:

$$e_a = \frac{1}{\tau(t)}\left|\frac{W(t)}{1+\tau_1 S}\right| \text{ and } e_b = \frac{1}{\tau_s}\left|\frac{W(t)}{1+\tau_1 S}\right|$$

Therefore the output of mixer 38 is an error voltage $\epsilon$ representable by:

$$\epsilon = e_a - e_b = \left[\frac{1}{\tau(t)} - \frac{1}{\tau_s}\right]\left|\frac{W(t)}{1+\tau_1 S}\right|$$

thus $\epsilon$ is indicative of the system time constant error which will take the sign of the difference $$\frac{1}{\tau(t)} - \frac{1}{\tau_s}$$

and will become zero when $$\frac{1}{\tau(t)} = \frac{1}{\tau_s}$$

The error signal $\epsilon$ is then passed through integrator 39 which performs the transform function of $K/S$ and is then used to control the system feedback gain 40 or $$\frac{1}{\tau}$$

so that $K\tau$ is automatically adjusted since the comparison of $\tau(t)$ and $\tau_s$ has already been made.

A second order closed loop servo system presents a somewhat different problem in so far as self-adaption is concerned. Such a system might be represented by a double integrator $$\left(\frac{A}{S^2}\right)$$

having a dual output therefrom fed back (such as a rate feedback $K_R S$ and a position feedback $K_D$) to a mixer which compares the feedback signals with an input voltage and provides the input signal for the double integrator.

Thus it can be seen that the closed loop transfer function is:

$$\frac{\theta_o}{\theta_i} = \frac{A}{S^2 + AK_R S + AK_D} = \frac{A}{S^2 + 2\zeta\omega_N S + \omega_N^2}$$

where:

$A$ = time varying system coefficient
$K_R$ = rate feedback gain coefficient
$K_D$ = position feedback gain coefficient
$\omega_N$ = system natural frequency and
$\zeta$ = damping ratio Note that:

$$\omega_N^2 = AK_D$$

and $$2\zeta\omega_N = AK_R$$

As $A$ varies as a function of time, the system natural frequency $\omega_N$ and the damping ratio $\zeta$ will also vary but for a system to be self-adaptive, the latter two quantities must be made invariant with time. A normal auto-pilot servo system is a second order closed loop system and a typical example is shown in FIGURE 5 wherein the system characteristic 42 is $$\frac{A}{S^2}$$

the position gain 43 is $K_D$ and the rate feedback 44 is $K_R S$. The closed loop transfer function of this system is:

$$\frac{\theta_o}{\theta_i} = \frac{AK_D}{S^2 + AK_R S + AK_D} = \frac{\omega_N^2}{S^2 + 2\zeta\omega_N S + \omega_N^2}$$

from which it can be seen that the steady state gain of this system is independent of the variations in $A$ and $K_D$. Self-adaption of $\omega_N$ and $\zeta$ is accomplished with the aid of the system impulse response:

$$\theta_o = \frac{\omega_N e^{-\zeta\omega_N t}}{\sqrt{1-\zeta^2}} \sin \omega_N \sqrt{1-\zeta^2}\, t$$

Differentiating and simplifying:

$$\dot{\theta}_o = \frac{\omega_N^2 e^{-\zeta\omega_N t}}{\sqrt{1-\zeta^2}} \sin (\omega_N \sqrt{1-\zeta^2}\, t - \psi)$$

where:

$$\psi = \tan^{-1} \frac{\sqrt{1-\zeta^2}}{\zeta}$$

hence:

$$\frac{|\dot{\theta}_o|av}{|\theta_o|av} = \omega_N$$

Since the last equation is a comparison of amplitudes, the phase angle $\psi$ does not appear. The circuit used for self-adaption of $\omega_N$ is shown in FIGURE 6 and is somewhat similar in operation to FIGURE 4. In FIGURE 6, the two low-pass filters 46 and 47 provide lag terms of $$\frac{1}{1+\tau_1 S} \text{ and } \frac{1}{1+\tau_o S}$$

respectively and are included as smoothing networks but do not effect the method of calculation or the accuracy of the answer. The foregoing is equally applicable to filters 48 and 49, of course.

For the self-adaption of $\zeta$, a slightly different approach is used. If the impulse response is integrated over the first half period then:

$$\int_0^{\frac{\pi}{\omega_N \sqrt{1-\zeta^2}}} \theta_o dt = e^{-\frac{\pi\zeta}{\sqrt{1-\zeta^2}}} + 1 \quad (1)$$

For the second half period:

$$\int_{\frac{\pi}{\omega_N\sqrt{1-\zeta^2}}}^{\frac{2\pi}{\omega_N\sqrt{1-\zeta^2}}} \theta_o dt = -e^{-\frac{\pi\zeta}{\sqrt{1-\zeta^2}}}\left[e^{-\frac{\pi\zeta}{\sqrt{1-\zeta^2}}} + 1\right] \quad (2)$$

Then the ratio of Equation 1 to Equation 2 above is $$-e^{-\frac{\pi\zeta}{\sqrt{1-\zeta^2}}}$$

Thus the ratio of the area of the first half period of the damped sine wave to the area of the second half period is a function of $\zeta$ alone. This relationship is advantageously employed in the circuitry shown in FIGURE 7 for self-adaption of $\zeta$.

In FIGURE 7, half-wave rectifier 51 is designed to pass only the positive excursions of $\theta_o$ while half-wave rectifier 52 passes only the negative excursions. The positive half loops of the sine wave from rectifier 51 are then passed through constant gain circuit 53 (which could be an attenuator, of course) and are amplified or attenuated by the factor $$e^{-\frac{\pi\zeta_s}{\sqrt{1-\zeta_s^2}}}$$

where $\zeta_s$ is the set or desired value of $\zeta$. The negative half loop is passed unattenuated by rectifier 52 and is then recombined with the output of constant gain circuit 53 at mixer 54. The combined signals are then fed through integrator 55, and if the system $\zeta$ equals $\zeta_s$, then the net output of the integrator 55, $K/S$, will be zero. If the system $\zeta$ is not equal to $\zeta_s$, then the output of integrator 55 will change in such a direction as to cause $\zeta$ to approach $\zeta_s$. This change in system $\zeta$ is accomplished by adjustment of the rate feedback gain $K_R$ by the output of the integrator 55.

If noise is superimposed on $\theta_o$, difficulties are encountered when using the impulse response to accomplish self-adaption of $\omega_N$. Previously developed theory based on taking the absolute value and averaging is no longer valid. Suitable filtering can be realized by the following analysis, however.

The integral of $\theta_o$ resulting from a unit impulse is:

$$\int_0^t \theta_o dt = 1 - \frac{e^{-\zeta\omega_N t}}{\sqrt{1-\zeta^2}} \sin (\omega_N\sqrt{1-\zeta^2}\, t + \psi)$$

and:

$$\int_0^t \theta_i dt = 1 \quad (t > 0)$$

therefore:

$$\int_0^t (\theta_i - \theta_o) dt = \frac{e^{-\zeta\omega_N t}}{\sqrt{1-\zeta^2}} \sin (\omega_N\sqrt{1-\zeta^2}\, t + \psi)$$

The process of integration attenuates any noise present in the input by a factor of $$\frac{1}{\lambda}$$

where $\lambda$ is the noise frequency. Further attenuation is provided by passing the output of the integrator through a filter of the form $$\frac{1}{(1+\tau_1 S)^2}$$

where $$\tau_1 = \frac{1}{\omega_N}$$

The phase angle introduced by the integration process does not interfere with the basic operation of the frequency sensing unit.

FIGURE 1 reveals a self-adaptive system in accordance with the present invention that is particularly useful as an autopilot for a rigid missile. The missile control system 60 has a system characteristic of $A/S^2$, and the missile is assumed to have a position gain of $K_D$ and a rate gain of $K_R$. The basic input or reference signal $\theta_i$ is produced by a navigation control system or programmer and is introduced to mixer 61 where it is compared with the system output voltage $\theta_o$ so as to produce an error signal output. This error signal is then amplified in position gain circuit 62 wherein the gain is controlled by the output of rigid body frequency self-adaptor circuitry to be described in more detail hereinafter. The output of position gain circuit 62 is then modified by the rate damping output in mixer 63 to prevent hunting type of oscillation and the output of mixer 63 then provides commands for system controls 60.

Output voltage $\theta_o$ is also fed back to mixer 64 which compares the system response with the input voltages $\theta_i$ so as to produce output error signals in a manner somewhat similar to that of mixer 61. One of the outputs of mixer 64 is fed to integrator 66 which performs a $1/S$ function and the output of integrator 66 is split between two parallel paths. The differentiator 67 and low-pass filter 68 provide a $$\frac{S}{1+\tau_1 S}$$

function while low-pass filter 69 provides a $$\frac{1}{1+\tau_1 S}$$

function for maintaining proper phase relation between the two parallel paths. Absolute value circuits 71 and 72 provide polarity or sign sense to their respective paths and could be full-wave rectifiers. Smoothing is provided by filters 73 and 74 which each provide a $$\frac{1}{1+2S}$$

function. The output of filter 73 is a voltage proportional to $\omega_N$. Constant gain circuit 75 is a fixed passive element having a gain or attenuation equal to a set or desired value of missile response frequency, $\omega_s$, and provides a reference for the system. The output signals of the two parallel paths are combined in mixer 77 and produce a resultant which, after passing through integrator 78, is used to control the gain of position gain circuit 62 which will compensate for variations of the actual frequency of the missile response to comply with the desired or set value of missile response.

As was pointed out hereinbefore, the ratio of the positive area of the damped sine wave from mixer 64 to the negative area is proportional to the damping ratio $\zeta$. Since the desired damping ratio $\zeta_s$ is known, the positive or negative excursions of the sine wave output from mixer 64 can be normalized with respect to $\zeta_s$ to produce a signal for correcting the system damping ratio. In particular, the output of mixer 64 can be fed to a pair of parallel half-wave rectifiers 81 and 82 with rectifier 81 designed to pass negative excursions while rectifier 82 is designed to pass positive excursions although it is to be realized that the rectification polarities could be the reverse of that constant gain circuit 83 which amplifies or attenuates the signal by a factor of $$e^{-\frac{\pi \zeta_s}{\sqrt{1-\zeta_s^2}}}$$

and this normalized signal is compared with the output of rectifier 81 in mixer 84. The comparative output of mixer 84 is then passed through integrator 85 $(K/S)$, the D.C. output of which is used to control the rate feedback circuit 86 $(K_R S)$ by means of controlling the gain of a variable gain amplifier. The operation of this damping ratio circuitry is substantially the same as that of the circuit described in FIGURE 7.

FIGURE 16 provides a more general illustration of a self-adapted closed loop control system along the line of that shown in FIGURE 1. In FIGURE 16, the vehicle system 150 indicates not only the vehicle itself but also all the various components thereof relating to the operation of the control system of the present invention. Thus vehicle system 150 includes a wide variety of parts and devices including propulsion and steering apparatus. The actual performance of the vehicle is sensed by feedback sensors 151 which produce feedback signals in a well known manner. Preselected reference signals produced by reference generator 152 are compared with the feedback signals in mixer-comparator 153 which produces an error signal $e1$ in proportion to deviations therebetween. Error signal $e1$ is then passed through natural frequency deviation detector 154 which produces an error signal output $e2$ in proportion to any natural frequency deviation. Error signal $e1$ is then amplified in variable gain device 155 in proportion to error signal $e2$. At the same time, deviation of the damping ratio present in error signal $e1$ will produce a third error signal $e3$ which is compared with the output of variable gain device 155 in mixer-comparator 157 to produce a final error signal $e4$. Error signal $e4$ is utilized to provide commands to system control 158 which in turn effects direct control of the vehicle system 150. Although connection 159 indicates that system control 158 is coupled mechanically to vehicle system 150, it is to be understood that connection 159 could also include electrical connections.

It should be noted that the symbols used to indicate error signals in the various figures hereof and the descriptions therefor such as $e1$, $e2$, etc. are not necessarily equivalent from one figure to the other.

Further, it should be recognized that the error signals produced by mixers 61 and 64 in FIGURE 1 are substantially identical. Accordingly, these two mixers are replaced in the system shown in FIGURE 16 with a single mixer 153. The natural frequency deviation detector 154 of FIGURE 16 in a typical system could be performed by the structure included between blocks 66 and 78 inclusive in FIGURE 1 while the damping ratio deviation detector 156 of FIGURE 16 could include blocks 81 through 86 from FIGURE 1. Thus in overall operation, the system of FIGURE 16 functions substantially the same as that shown in FIGURE 1.

For small or relatively inelastic missiles, the system described in FIGURE 1 is generally quite sufficient for a self-adaptive autopilot control system. However, sensing devices in larger missiles will also produce output signals as a result of the elastic motion of the missile and these undesired frequencies will be present at the system output response $\theta_o$ shown in FIGURE 1. The elastic frequencies must somehow be blocked from the autopilot feedback loop since there is a high probability of regenerative feedback occurring and to further complicate the filtering problem, both the undesired elastic frequencies and the desired rigid body motion frequency tend to shift during missile flight which means of course, that the filter arrangement employed cannot be a standard fixed type of filter but must be capable of following or tracking the aforementioned frequency variations.

Therefore, a system has been developed in accordance with the present invention wherein a periodic complex waveform comprising a varying multiplicity of sine waves can be continuously scanned so that the desired varying frequency can be passed while the undesired varying frequencies will effectively be cancelled. The fundamental principle upon which the self-tuning frequency sensor of the present invention is based is the relationship between the amplitudes of a sine wave and its derivatives. Assuming a sinusoidal input represented by:

$$e_i = A \sin \lambda t$$

and:

$$\frac{d}{dt} e_i = A\lambda \cos \lambda t$$

$$\frac{d^2}{dt^2} e_i = -A\lambda^2 \sin \lambda t = -\lambda^2 e_i$$

From these equations it can be seen that if the first or second derivative of the input voltage is taken and the resultant output compared with the original input maintaining proper phase relationships, a measure of the input frequency is obtained. This principle is extended in the system of this invention to accommodate inputs consisting of the sums of N sine waves of any phase which are damped or undamped. If N sine waves are present at the input, N channels of the circuit are required.

FIGURE 8 is a block diagram of one self-tuning frequency sensor channel in accordance with the present invention. The complex input voltage, $e_i$, is first channeled through a simple variable tuning filter 91 which has a transfer function of $$\frac{1}{\tau a^2 S^2 + 1}$$

where $\tau a$ is a variable circuit coefficient. The break frequency for filter 91 may be tuned to any point along the frequency axis by adjustment of the coefficient $\tau a^2$. The amplitude versus frequency curve for filter 91 is shown in FIGURE 9 from which it can be seen that the output amplitude would theretically become infinite when the incoming signal was of the same frequency as the tuned frequency of filter 91, $\lambda_f$, if no control were exercised over the signal $e_1$ out of filter 91. In order to overcome this difficulty and still maintain the undamped filter characteristic in the system in FIGURE 8, an amplitude control circuit 92 is employed which limits the amplitude of the filter output $e_1$ to any desired magnitude. Amplitude control circuit 92 will introduce a slight amount of distortion but this distortion will have negligible adverse effect on system accuracy. A more detailed treatment of amplitude control circuit 92 will be provided later in this description.

The signal $e_1$, therefore, is a constant amplitude sine wave whose frequency corresponds to one of the component frequencies of the input, i.e., that frequency to which the input filter 91 has been tuned. The actual tuning of filter 91 will now be explained.

The signal $e_1$ is split and fed into two parallel paths, one of which includes the differentiator-low-pass filter 94 with the low-pass filter function of filter 94 being included to limit the magnitude of high frequency noise. The entire circuit 94 provides an overall transfer function of $$\frac{S^2}{(\tau_B S + 1)^2}$$

where $\tau_B$ is a variable coefficient for circuit 94. The other parallel path includes low-pass filter 93 to maintain the proper magnitude and phase relationship between $e_2$ and $e_3$ by providing a transfer function of $$\frac{1}{(\tau_B S + 1)^2}$$

The polarity or sign sense is added to $e_2$ and $e_3$ by absolute value circuits 96 and 97 which may be full-wave rectifiers. After taking the absolute values through circuits 96 and 97, the waveforms of $e_4$ and $e_5$ are full wave rectified sine waves of the same phase, and the amplitude of $e_5$ is $\lambda^2$ times the amplitude of $e_4$. Since there is an amplitude difference between $e_5$ and $e_4$ by a factor of $\lambda^2$, multiplier 98 increases the magnitude of $e_4$ by a factor of $e_0$ so that $e_6$ will equal $e_5$ when $e_0$ equals $\lambda^2$ and for this condition $\epsilon = 0$.

Next considering the output signal $e_0$, it shall be proven that if the output is not equal to the square of the frequency present at $e_1$, the resulting error will be of such a sign as to drive the input filter 91 in the proper direction along the frequency axis. The output $e_0$ and as a result the filter 91 will reach a state of equilibrium when $e_0 = \lambda^2$ and at that time the input filter 91 will be tuned to the frequency $\lambda$.

Assuming that $e_0$ is of a value $e_{o1}$ such that $e_{o1} < \lambda^2$ IE:

$$e_{o1} = \lambda^2 - \delta \text{ and } \delta > 0$$

If the amplitudes of the various signals in FIGURE 8 are examined it will be found that:

$$e_6 = e_4 e_{o1} = e_4(\lambda^2 - \delta) = e_4\lambda^2 - e_4\delta$$

But:

$$e_5 = \lambda^2 e_4$$

and the error signal from mixer 99 is:

$$\epsilon = e_5 - e_6$$

thus:

$$\epsilon = \lambda^2 e_4 - \lambda^2 e_4 + e_4\delta = e_4\delta$$

which is a positive voltage since $e_4$ is always positive and $\delta > 0$.

Next assume that $e_0$ is of the value $e_{o2}$ where:

$$e_{o2} > \lambda^2$$

$$e_{o2} = \lambda^2 + \delta \text{ and } \delta > 0$$

Once again:

$$\epsilon = e_5 - e_6 = \lambda^2 e_4 - e_4(\delta + \lambda^2)$$

$$\epsilon = \lambda^2 e_4 - \lambda^2 e_4 - e_4\delta = -e_4\delta$$

which is a negative voltage since $e_4$ is always positive and $\delta > 0$. The error signal $\epsilon$ is integrated through integrator 101 by a transfer function of $K/S$ and the resulting signal $e_0$ is used to tune the variable frequency input filter 91 by adjusting coefficient $\tau_o^2$. The square root of $e_0$ is a voltage proportional to the frequency $\lambda$ to which input filter 91 is tuned.

If the input filter 91 is tuned to frequency $\lambda_f$ and the nearest frequency component present at $e_1$ is $\lambda_i$ such that $\lambda_f \ll \lambda_i$, then $e_1$ is very small and as a result $\epsilon$ is also very small. As $\lambda_f$ approaches $\lambda_i$, however, $\epsilon$ increases in magnitude until $\lambda_f \cong \lambda_i$. These undesirable conditions result in low initial tuning rates of input filter 91. In order to overcome this potential difficulty, an automatic sweep feature as shown in FIGURE 11 can be added to the frequency sensor system of FIGURE 8. Referring to FIGURE 11, a constant error signal voltage, $\epsilon_0$, is connected to the input of error integrator 101 via mixer 99 when relay 104 is not energized. The position of relay arm 105 is determined by the magnitude of the envelope of $e_1$, a hypothetical case of which appears in FIGURE 10. When $e_1 < e_r$, the relay 104 is open as shown in FIGURE 11 and error integrator 101 integrates $\epsilon_0$ driving the input filter 91 along the frequency axis at a constant rate. As the filter 91 tunes in on a frequency the envelope of $e_1$ builds up until $e_1 > e_r$ at which time relay 104 is closed grounding the input from $\epsilon_0$ after which the frequency sensor operates as previously described.

Referring again to FIGURE 8, the output signal $e_0$ of integrator 101 is not only used to tune input filter 91 but also is used to tune rejection filter 102 to the same frequency, $\lambda$. The input, $e_i$, is fed through this rejection filter 102 which suppresses the previously measured frequency and thus $e_7$ will be a complex waveform substantially the same as that present at $e_1$ with the exception that the frequency $\lambda$ has been removed therefrom. Output $e_7$ from rejection filter 102 could then be introduced to another frequency sensor channel designed substantially the same as the channel just described. By this arrangement, as many channels as might be desired can be cascaded much like a spectrum analyser. For purposes of autopilot servo loop applications, initial conditions will be placed on all output integrators and if these initial conditions represent frequencies lower than the lowest frequency anticipated at the input, then the first frequency sensing channel will measure the lowest frequency, the second channel will measure the next higher frequency, and so on.

FIGURE 12 shows a more detailed block diagram of input filter 91 and the relationship thereto of amplitude control circuit 92. Amplitude control circuit 92 could comprise biased diodes designed to feed a signal $e_d$ back to filter 91 when voltage $e_1$ exceeds some predetermined maximum amplitude or dead band. That is to say amplitude control 92 might be set at a one volt level so that when $e_1$ is ½ volt, no signal will appear at $e_d$ but if $e_1$ is 1½ volts it will appear. As noted hereinbefore, the purpose of amplitude control 92 is to prevent $e_1$ from approaching infinite amplitude when the frequency to which filter 91 is tuned equals λ. FIGURE 13 reveals the typical dead band characteristics for amplitude control circuit 92.

Returning to FIGURE 12 and assuming normal operation wherein $e_o$ is proportional to $\lambda^2 e_1$, then the output of mixer 107 will be:

$$e_a = e_1 - \lambda^2 e_1$$

After passing $e_a$ through integrator 108:

$$e_b = \frac{1}{s}[e_i - \lambda^2 e_1]$$

Then $e_b$ is combined with $e_d$ in mixer 109 so that:

$$e_c = \frac{1}{s}[e_i - \lambda^2 e_i] - e_d$$

Therefore, the output of filter 91 after passing $e_c$ through integrator 110 is:

$$e_1 = \frac{1}{S^2}[e_i - \lambda^2 e_1 - s e_d]$$

When $$e_d = 0 (e_1 < A) \frac{e_1}{e_o} = \frac{1}{S^2 + \lambda^2}$$

which represents a second order filter of zero damping tuned to the frequency λ. When $e_1 > A$, damping is added to the system by means of amplitude control circuit 92. Distortion is kept to a minimum by proper adjustment of the width of the dead band and the gain K for amplitude control circuit 92.

The foregoing aspect of the present invention could also be constructed using a double integration instead of a double differentiation or a single differentiation or integration. This device provides a continuous measurement of low frequencies on the order of 1 or 2 radians per second with very little time delay. The input may be any complex waveform which is made up of the sums of sinusoids damped or undamped, and the system of measurement is still valid even if each component frequency is a function of time.

It should now be fully appreciated that another aspect of the present invention involves the inclusion of a frequency sensor or sensors in accordance with FIGURE 8 in a system such as is shown in FIGURE 1 so as to provide a novel automatic frequency sensing, self-adaptive control system. A typical arrangement for such a system is shown in FIGURE 14 wherein elastic frequencies are compensated for at tuned filter 114 which is controlled by frequency sensor 115. It should be understood that the rigid body motion information is passed by frequency sensor 115 into the servo loop to provide proper controls as described more fully for FIGURE 1 and for this purpose frequency sensor 115 would normally include a series of cascaded frequency sensors one section of which is shown in FIGURE 8. It is generally anticipated that the rigid body motion will tend to vary about a frequency of approximately one cycle per second while the elastic motion will tend to occur between 5 and 10 cycles per second. The systems described for FIGURE 1 and FIGURE 8 have been successfully simulated on an analog computer.

FIGURE 15 reveals a system such as that shown and described for FIGURE 1 hereinbefore as modified to function as a self-adaptive autopilot for an elastic missile. It should be appreciated that only so much of the elements of FIGURE 1 are shown as are needed to correlate the modification to the FIGURE 1 type of system, the operation of the omitted portions of the system being substantially as described hereinbefore. FIGURE 15 is designed around a hypothetical missile with the rigid body self-adapted to 1 radian/sec., damping ratios of 0.5 and 0.65, and two bending modes given nominal values of 2 and 4 radians/second. The problem is solved under the assumption that the bending frequencies are initially unknown. Thus, the system is required to find these deleterious dynamic effects and then to set the required compensation accordingly.

Alternate positive and negative pulses are applied approximately once every ten seconds as input signals, $\theta_i$, for the autopilot system. These pulses excite the missile system weighting function that consists approximately of a damped sinusoid corresponding to the rigid body motion, and a series of lightly damped sinusoids corresponding to the elastic bending frequencies. This impulse response or weighting function is then decomposed to obtain the information required for self-adaption of the rigid body dynamics and for compensation of the elastic frequencies. The portion of the system that is enclosed by dashed line 120 in FIGURE 15 provides elastic compensation for the feedback loop. The output signal $\theta_o$ of the missile is first fed into a fixed filter 121 with a transfer function of:

$$\frac{e_0}{\theta_i} = \frac{K_s[S^2 + 0.04S + 1]}{(S+1)(S+2)(S+4)}$$

Filter 121 is set to attenuate the self-adapted rigid body portion of the response which means, of course, that the output of filter 121 is predominantly undamped elastic terms which are then fed to a first frequency sensor 122. First bending mode frequency sensor 122, as explained previously, picks out the lowest frequency present in the residue of elastic mode signals from filter 121. That is, the lowest bending mode present will be picked out by sensor 122 as it tunes itself. In doing so, it introduces a controlled compensation in the missile forward loop such as by tuning tuned filter 123 for suppressing the first bending mode. Shifting of the frequency characteristics of the various tuned filters or compensating networks as mentioned herein in connection with the introduction of controlled compensation into the forward loop can be accomplished by any of several known means. For instance, this can be accomplished electro-mechanically through a servo-multiplier. By such an arrangement, an electrical signal would be supplied to the servo which, in turn, would mechainically change the value of one of the elements in a filter network thus controllably changing the natural frequency thereof. Thus, compensation which is introduced to the system through the medium of the various frequency sensitive networks is accomplished for the system as a function of the controlled frequency characteristics of the various networks involved.

In addition, sensor 122 tunes the first bending mode rejection filter 124 which is in the adaptive loop so that the input to the second bending mode frequency sensor 125 will be the elastic residue from filter 121 less the first bending mode frequency. The second bending mode frequency sensor 125 picks out the second bending mode frequency since it is now the lowest present in the input signal. In so doing sensor 125 introduces compensation in the missile forward loop in a manner that will be more readily understood from the following: as sensor 125 calculates the second bending mode frequency it simultaneously controls the compensation network in the missile forward loop to correspond to the calculated frequency. In the illustrative embodiment shown in FIGURE 15, sensor 125 tunes tuned filter 126 for suppressing the second bending mode by varying the frequency characteristics thereof as was mentioned hereinbefore in conjunction with tuned filter 123. It should be realized that additional capacity could be added to the loop of compensation circuitry 120 if additional detrimental dynamics are present. In such an arrangement, the pattern of operation would be the same as described for the other two bending modes.

It should be appreciated that, in addition to removal or suppression of the bending mode signals, FIGURE 15 in conjunction with the other FIGURE 1 circuitry which is omitted from FIGURE 15 for simplification purposes will function as previously explained to set $K_D$ and $K_R$ to provide the system with a constant rigid body frequency and damping ratio. In reference to FIGURE 1, it should be noted that this system can be modified so that the output of integrator 66 instead of the output of mixer 64 will provide the input to rectifiers 81 and 82 so as to suppress noise and to attenuate the bending frequencies. The damping ratio detection function provided by measurement of the ratio of positive to negative area of the pulses was found to perform better than the one based on differentiations.

FIGURE 17 illustrates an arrangement wherein the self-tuning feature may be incorporated into the system shown in FIGURE 1. The feedback signal is taken from system 60 to control operation of filter 165, frequency sensor 166 and tuned filter 167 with the latter being serially connected between mixer 63 and system 60. The operation of the tuning feature has been described in more detail hereinbefore for block 120 in FIGURE 15.

FIGURE 18 reveals a self-adaptive control system in accordance with the present invention which includes means for compensating for rigid body natural frequency deviations only. The system here shown is particularly useful in conjunction with a missile and the operation of the rigid body motion detecting and compensating channel including blocks 173 through 179 inclusive has been described in more detail hereinbefore, thus obviating the need for an extended discussion and analysis at this point. In comparing FIGURE 18 with FIGURE 1, however, it should be recognized that integrator 173 provides the same output as both mixers 61 and 64 whereas integrators 174 and 178 are directly analogous to integrators 66 and 78 respectively. It should be further noted that the rigid body natural frequency signal generator 175 of FIGURE 18 compares directly with the overall operation of blocks 67, 68, 71 and 73 in FIGURE 1 whereas the normalized rigid body reference signal generator 176 compares directly with the overall operation of blocks 69, 72, 74 and 75. Accordingly, the operation of the FIGURE 18 blocks between integrators 174 and 178 is exactly the same as the operation of the FIGURE 1 system between integrators 66 and 78. Further, mixer 177 compares directly with mixer 77 while variable gain amplifier 179 compares directly with position gain 62. It should be appreciated that the system illustrated in FIGURE 18 does not include any self-adaptive rate damping structure such as mixer 63 and blocks 81 and 86 of FIGURE 1. The FIGURE 18 system would be particularly useful where the system response would be sufficiently slow to render the hunting problem insignificant.

The systems shown and described hereinbefore are intended as being exemplary only and the invention itself both as to its design and utilization is not intended to be strictly limited thereto. There are many variations within the spirit of this invention and these variations will be evident to those persons having normal skill in the art.

What is claimed is:

1. A self-adaptive, closed loop control system for controlling movement of a body comprising means for generating reference signals, sensing means for producing a feedback signal representative of the response of said control system, first mixing means connected and designed for comparing said reference signals and said feedback signals thereby providing a first error signal, detector means coupled to receive said first error signal for providing a second error signal indicative of the deviation of the natural frequency of said system from a desired natural frequency, variable gain means coupled to receive said first error signal and being designed to amplify said first error signal by a factor controlled by said second error signal, damping ratio control means for comparing the excursions of one polarity of said first error signal with the excursions of the other polarity attenuated by a factor proportional to a desired damping ratio thereby producing a third error signal when the ratio of said excursions deviates from said desired damping ratio, second mixing means designed to produce a fourth error signal by comparing the outputs of said variable gain means and said third error signal, and system control means constructed and arranged to produce corrective movements of said body in accordance with said fourth error signal.

2. A self-adaptive autopilot system for a vehicle comprising circuit means for generating reference signals, system control means for actuating movement and position control devices for said vehicle and including sensing devices for providing a feedback signal representative of the response of said vehicle, means for comparing said feedback signal and said reference signals for producing a first error signal, first integrator means connected to receive said first error signal, a pair of parallel paths commonly connected to receive the output of said first integrator, one of said parallel paths including means for establishing a voltage proportional to the natural frequency of said system from the output of said first integrator and the other of said parallel paths including means for attenuating the output of said first integrator by a factor proportional to a preselected natural frequency, first mixer means for comparing the outputs of said parallel paths thereby providing a second error signal when the natural frequency of said system deviates from the said preselected natural frequency, first variable gain means having said first error signal coupled thereto and having the gain thereof controlled by said second error signal, first and second half-wave rectifier means commonly connected to receive said first error signal, one of said rectifier means being designed to pass positive excursions while the other of said rectifier means being designed to pass negative excursions, amplifier means connected to be energized by the output of said first rectifier means and to amplify said output by a factor proportional to a preselected damping ratio, second mixer means for comparing the output of said amplifier means with the output of said second rectifier means to provide a third error signal whenever the damping ratio of said system deviates from said preselected damping ratio, second integrator means connected for converting said third error signal into a D.C. control signal, second variable gain means having the input thereof coupled to receive said feedback signal and being constructed and arranged to amplify said feedback signal in accordance with the magnitude of the output of said second integrator, third mixer means connected to compare the outputs of said first and second variable gain means for producing a fourth error signal, said fourth error signal being coupled to said system control means to provide actuating signals for said movement and control devices.

3. A self-adaptive autopilot system in accordance with claim 2 in which the said one of said parallel paths includes first, second and third serially connected stages, said first stage being a differentiator having low pass filter characteristics, said second stage being a device for converting the input excursions that are positive and negative with respect to ground potential to output signals having excursions of the same polarity as one another, and said third stage comprising a smoothing filter so that the output of said one of said parallel paths is substantially a D.C. signal, said other of said parallel paths including fourth, fifth, sixth and seventh stages connected in series in the order named, said fourth stage being a low pass filter having substantially the same phase shift as said first stage, said fifth stage being a device for converting the excursions of the input signals thereto to the same polarity, said sixth stage being a smoothing filter so that the output thereof is substantially a D.C. signal, and said seventh stage having a constant gain proportional to the said preselected natural frequency.

4. A self-adaptive autopilot system in accordance with claim 2 which includes means for removing undesired signals from the feedback loop of said system comprising, fixed filter means coupled to receive said feedback signal so as to pass a frequency band encompassing the said undesired signals, a frequency sensor coupled to the output of said fixed filter and being designed to continuously tune until one of said undesired signals is determined, first tuned filter means connected to provide the coupling of said fourth error signal into said system control means and being designed so that the rejection frequency thereof is tuned by said frequency sensor thereby preventing one of said undesired frequencies from being present in the servo loop of said system.

5. A self-adaptive autopilot system in accordance with claim 2 which includes a fixed filter connected to receive said feedback signal for rejecting the system natural frequency while passing undesired frequencies, a plurality of frequency sensors each capable of continuously tuning until an undesired signal is determined, the first one of said plurality of frequency sensors being coupled to receive the signals passed by said fixed filter, a plurality of variable tuning filter means coupled in series relation so as to provide the coupling of said fourth error signal into said system control means, each of said frequency sensors being connected to control the tuning of a respective one of said variable tuning filter means, means for removing from the input of each succeeding said sensor the frequency sensed by the preceding said frequency sensor whereby the said undesired signals will be blocked from the closed loop of said servo system.

6. A frequency sensor for removing an undesired frequency from a complex waveform of sinusoidally varying signals comprising a variable band-pass input filter connected to receive said complex waveform and having the output thereof coupled to a first junction point, differentiator circuit means having the input thereof connected to said first junction point and being designed to have low-pass filter characteristics for suppressing noise signals, a first absolute value circuit coupled to receive the output of said differentiator circuit means to convert input excursions into output signals having a common polarity representative of the absolute value of said excursions, low-pass filter means having the input thereof coupled to said first junction point for maintaining a substantially constant phase relationship between the output signals thereof and the output of said differentiator circuit means, a second absolute value circuit coupled to receive the output of said low-pass filter means to convert input excursions into output signals having a common polarity representative of the absolute value of said excursions, integrator means having the output thereof connected to a second junction point, means coupled for multiplying the output from said second absolute value circuit and the output of said integrator means to produce a product signal, mixer circuit means for combining the output of said first absolute value circuit and said product signal so as to produce an error signal when a deviation occurs therebetween, said error signal being coupled to said integrator means to produce a substantially DC signal at said second junction point, said second junction point being connected to said variable pass-band filter to shift the center frequency thereof until said error signal attains a minimum magnitude, and rejection filter means having the input thereof coupled to receive said complex waveform and being designed so that the frequency rejected thereby substantially equals the frequency passed by said variable band-pass input filter whereby the output of said rejection filter means is the said complex waveform with the frequency to which said rejection filter is tuned removed therefrom.

7. A frequency sensor in accordance with claim 6 which includes feedback circuit means for feeding the signal present at said first junction point back into said variable band-pass input filter for providing a maximum limit for the amplitude of output signals from said input filter.

8. A frequency sensor in accordance with claim 7 in which said variable band-pass input filter includes first signal mixing means having coupled thereinto the said complex waveform and the signal present at said second junction point, a first integrator circuit coupled to receive the output of said first signal mixing means, second signal mixing means, and a second integrator circuit coupled to said first integrator circuit by said second mixing means and having the output thereof connected to said first circuit point, said feedback circuit coupling signals above a preselected minimum magnitude from said first circuit point into said second signal mixing means.

9. A frequency sensor in accordance with claim 6 which includes means for introducing a constant simulated error signal into said integrator means, and means for removing said simulated error signal when an output signal is present at said input filter whereby said input filter will be constantly tuning until a frequency to be removed from said complex waveform is determined.

10. A self-adaptive, closed loop autopilot system for a missile comprising, position control means for controlling the attitude of said missile, sensing means for detecting the position and response of said missile and for developing a feedback signal representative thereof, means for producing reference signals in accordance with a preselected program, comparator means coupled to receive said reference signals and said feedback signal for producing a first error signal representative of the difference therebetween, first integrator means controlled by said first error signal, first and second parallel circuit means having the inputs thereof commonly connected to the output of said first integrator means, said first parallel circuit means being constructed and arranged for producing an output voltage proportional to the natural frequency of rigid body motion of said missile, said second parallel circuit means being constructed and arranged for producing an output voltage normalized in proportion to a preselected rigid body natural frequency, first mixing means for comparing the output voltages of said first and second parallel circuit means for developing a second error signal when the natural frequency of rigid body motion of said missile deviates from said preselected rigid body natural frequency, second integrator means coupled to receive said second error signal, variable gain means for amplifying said first error signal in accordance with the magnitude of the output of said second integrator means, and coupling means for introducing the output of said variable gain means into said position control means for governing the actuation thereof, whereby the natural frequency of rigid body motion of said missile will be corrected and maintained at substantially the same frequency as said preselected rigid body natural frequency.

11. A self-adaptive, closed loop autopilot system for a missile in accordance with claim 10 in which said coupling means includes a second mixing means, and which includes third and fourth parallel circuit means commonly connected to receive said first error signal, said third parallel circuit means including means for rectifying said first error signal so that the output thereof will include excursions of a first polarity only, said fourth parallel circuit means including means for rectifying said first error signal so that the output thereof will only include excursions of a polarity opposite said first polarity and including means for amplifying the output of said rectifying means by a factor proportional to a preselected damping ratio, third mixing means for comparing the outputs of said third and fourth parallel circuit means to provide a third error signal when the damping ratio of said autopilot deviates from said preselected damping ratio, third integrator means for producing a substantially DC output from said third error signal, second variable gain means for amplifying said feedback signal in accordance with the magnitude of the output of said third integrator means, said second mixing means being coupled to compare the output of said variable gain means and said third integrator means thereby providing rate damping corrected and maintained at substantially the same ratio as said preselected damping ratio.

12. A self-adaptive, closed loop autopilot system for a missile in accordance with claim 11 which includes frequency sensor means connected to remove all frequencies except the said natural frequency of rigid body motion of said missile from the said feedback signal.

References Cited in the file of this patent

UNITED STATES PATENTS 2,981,500    Carlton _____ Apr. 25, 1961